July 18, 1939. J. SCHAUB 2,166,197
WORKING AND KNEADING APPARATUS
Filed Dec. 6, 1934   3 Sheets-Sheet 1
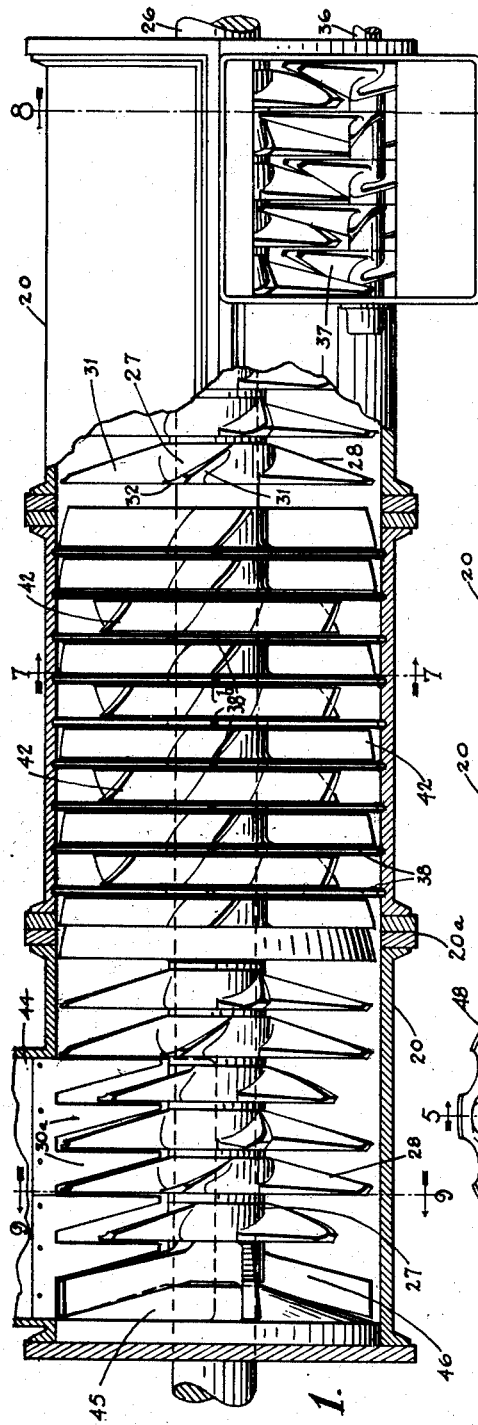
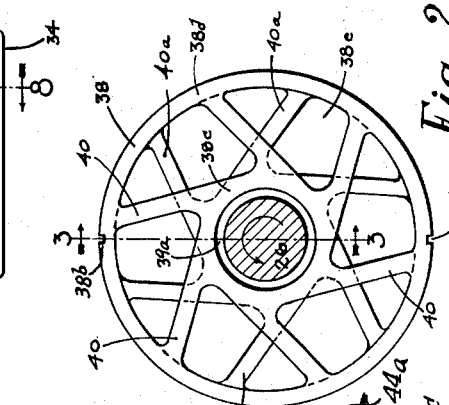
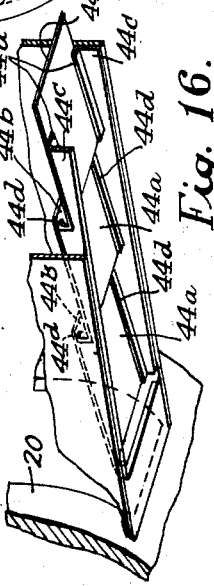
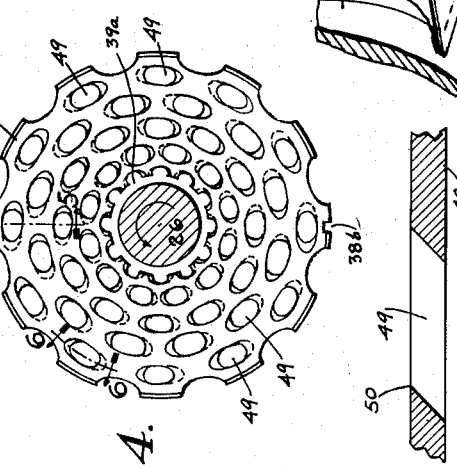
INVENTOR
JACOB SCHAUB
BY
Paul R Ames
ATTORNEY July 18, 1939.　　　J. SCHAUB　　　2,166,197
WORKING AND KNEADING APPARATUS
Filed Dec. 6, 1934　　　3 Sheets-Sheet 2
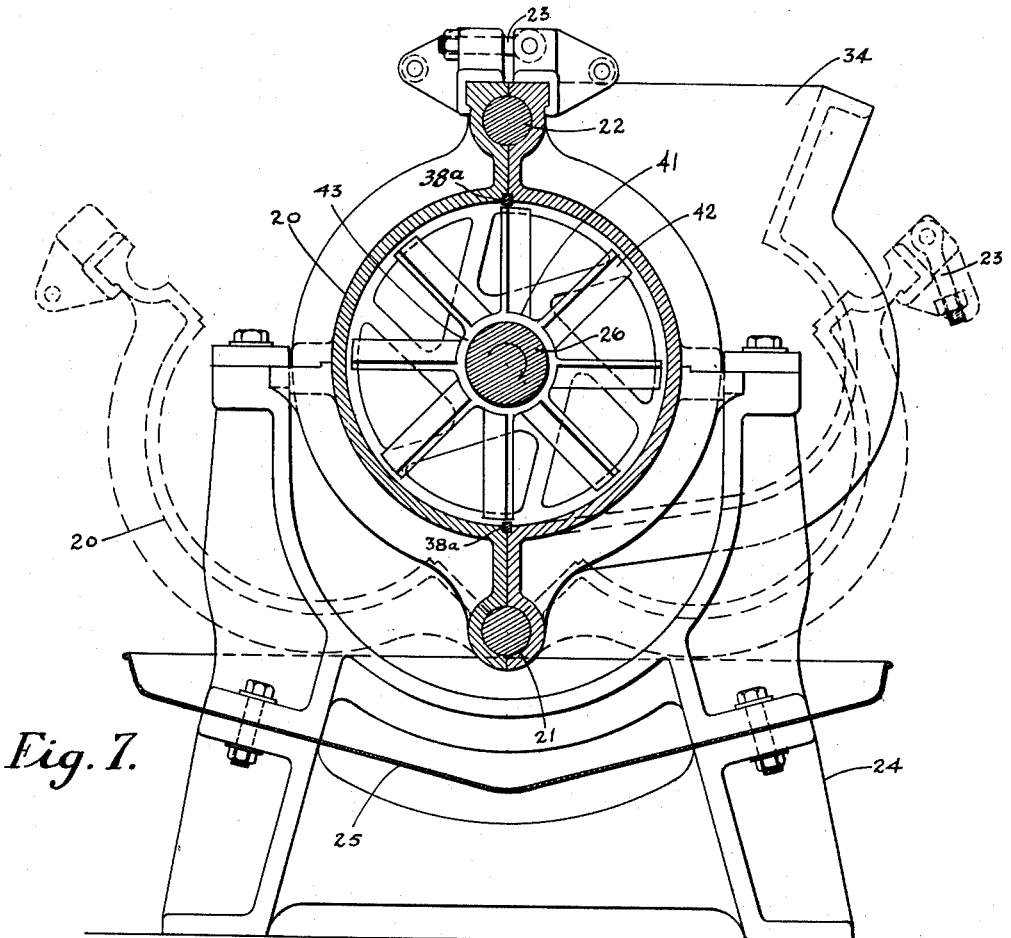
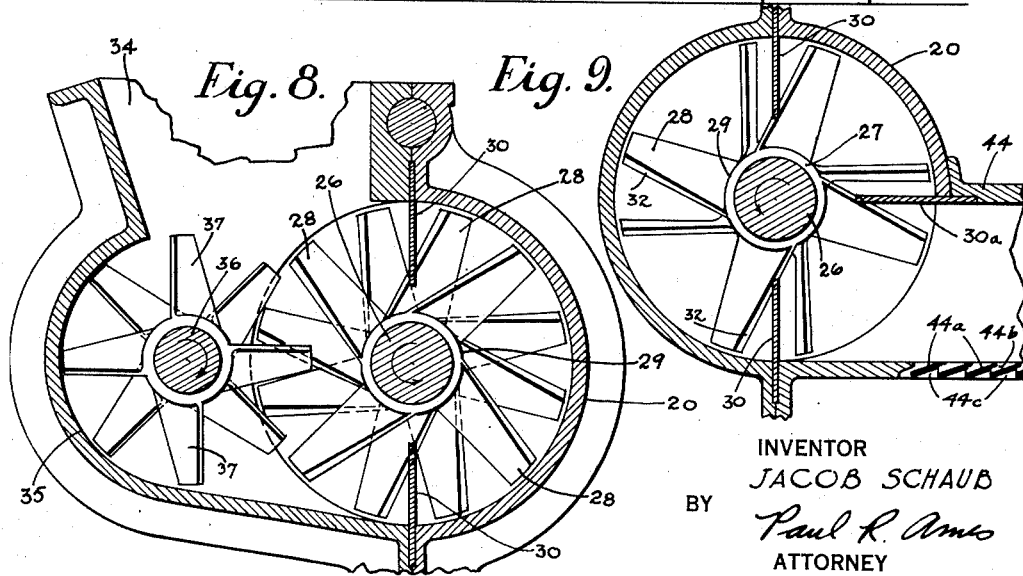
INVENTOR
JACOB SCHAUB
BY
Paul R. Ames
ATTORNEY July 18, 1939.  J. SCHAUB  2,166,197
WORKING AND KNEADING APPARATUS
Filed Dec. 6, 1934  3 Sheets-Sheet 3
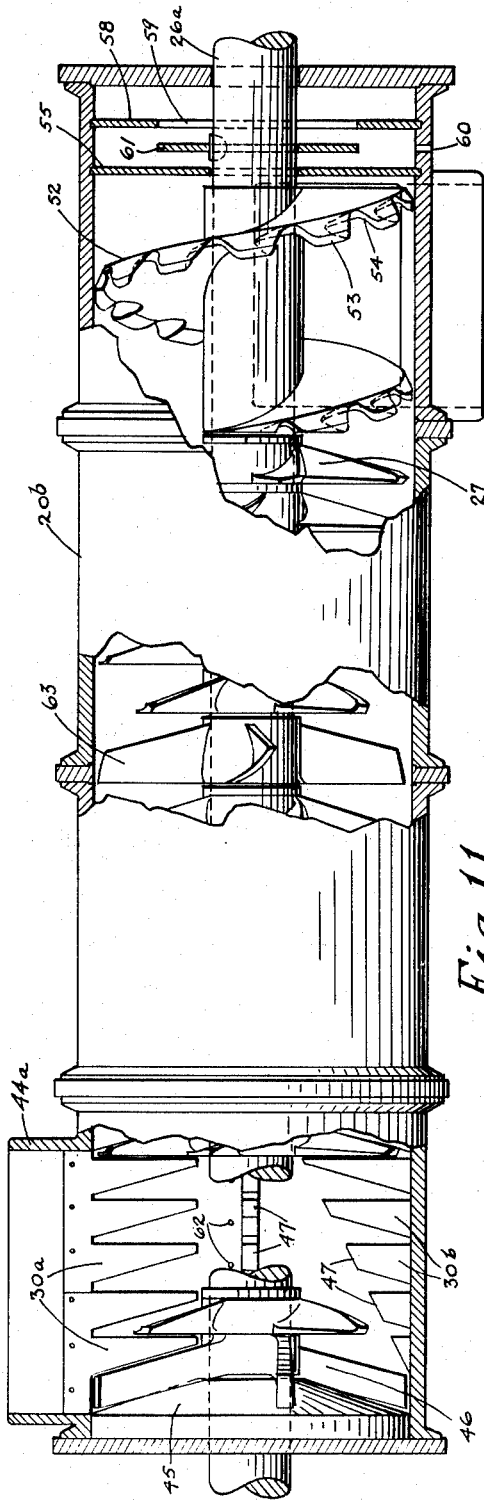
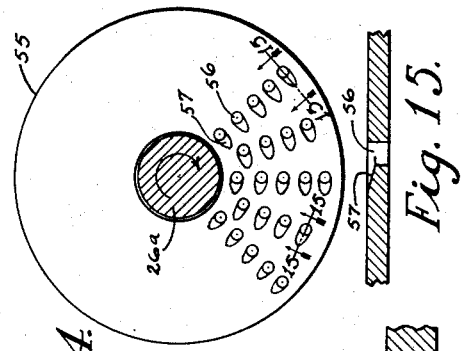
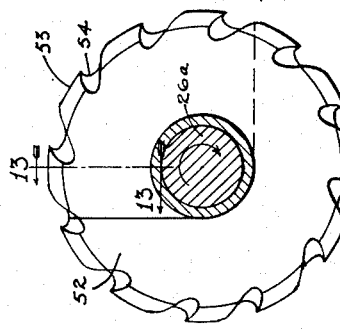
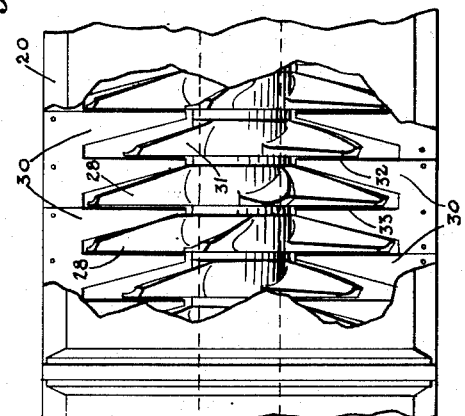
INVENTOR
JACOB SCHAUB
BY
Paul R. Ames
ATTORNEY Patented July 18, 1939

2,166,197

UNITED STATES PATENT OFFICE 2,166,197

WORKING AND KNEADING APPARATUS

Jacob Schaub, Westfield, N. J., assignor to The Best Foods, Inc., New York, N. Y., a corporation of Delaware Application December 6, 1934, Serial No. 756,236

19 Claims. (Cl. 31—35)

This invention relates to a working and kneading apparatus and particularly to an improved apparatus for working and kneading the crystallized particles of the oil-milk emulsion used in the preparation of margarine.

In my copending application, Serial Number 621,651, filed July 9, 1932, which issued April 20, 1937 as Patent Number 2,077,644, and of which the present application is a continuation in part, there is described an apparatus for preparing margarine including a worker, an expeller for removing water liberated in the worker, a salter and a second worker or blender. The present invention relates particularly to the worker for such a system and includes certain improvements and modifications over the worker described in that application.

In the preparation of margarine, it is important to obtain a consistency as near that of natural butter as is possible. In order to do this, the proper quantity and distribution of water in the resulting mass are important. The crystals of oil-milk emulsion from the chill bath must be worked and kneaded in such a manner that the temperature of the mass is increased gradually to give the proper working consistency and the entrained water is redistributed to give a butter-like mass, the excess water being separated from the mass, for example, in an expeller, as described in my above mentioned application or in my application Serial Number 756,237, filed December 6, 1934, entitled "Expeller", and which issued October 26, 1937 as Patent Number 2,097,423.

It is an object of the present invention to provide an improved apparatus for working and kneading the crystals of the oil-milk emulsion whereby the excess water may be separated more readily and a product of improved consistency may be obtained. It is also an object to provide a device in which the oil-milk emulsion crystals may be subjected to a sufficient rubbing action to separate excess water from the crystals with the maximum retention of the milk of the emulsion. A further object is to provide such a rubbing action as to rub out a portion only of the crystals and separate the liquid therefrom and leaving the desired quantity of moisture in the remaining crystals. A further object is to provide means for separating from the plastic mass water freed by this treatment. Other and more specific objects will become apparent.

In describing the invention reference will be made to the drawings, in which Figure 1 is a plan view of the apparatus with a portion of the casing broken away to illustrate the interior thereof.

Figure 2 is an elevation of one of the plates in the apparatus.

Figure 3 is a detailed fractional section of the plate illustrated in Figure 2, taken on line 3—3 and including a section of the casing to show the position of the plate in the casing, portions of the plate and shaft being broken away and the remaining portions thereof moved together.

Figure 4 is a view similar to Figure 2 of a modified form of plate.

Figure 5 is a view similar to Figure 3 of the plate illustrated in Figure 4, taken on the line 5—5 thereof and including a section of the casing.

Figure 6 is a fractional section of the plate illustrated in Figure 4 taken on the line 6—6 thereof.

Figure 7 is a sectional view taken on the line 7—7 of Figure 1 and also showing the casing in open position in dotted lines and illustrating the position of the hopper.

Figures 8 and 9 are sectional views taken on the lines 8—8 and 9—9, respectively, of Figure 1.

Figure 10 is a fractional side elevation of a section of the apparatus, a portion of the casing being broken away to illustrate the propellers and the teeth.

Figure 11 is a view similar to Figure 1 of a modified form of worker or kneader, portions of the casing being broken away to illustrate the interior thereof.

Figure 12 is an end view of the conveyor screw illustrated in Figure 11, taken from the left-hand end of the screw.

Figure 13 is a sectional view of a portion of the conveyor screw illustrated in Figures 11 and 12, taken on line 13—13 of Figure 12, a portion being broken away and the remaining portions moved together to illustrate the conveyor screw in a restricted space.

Figure 14 is an elevation of a plate in the apparatus shown in Figure 11.

Figure 15 is a fractional sectional view taken on line 15—15 of Figure 14.

Figure 16 is a perspective view of a portion of the trough at the outlet end of the device shown in Figure 1.

In describing the apparatus reference will be made to the numerals of which the numeral 20 indicates the cylindrical casing of the kneading apparatus, which casing may be made up in sections separated by frame sections 20a, as illustrated in Figure 1, each section of the casing being divided into halves and hinged, as illustrated in Figure 7, about a horizontal bar 21. The upper portions of these sections may be held together around horizontal bar 22 by suitable clamping bolts, as illustrated at 23. The edges of the sections of the casing 20 are fitted to the frame sections 20a by ground joints, so as to provide a tight fit between the sections of the casing and the frame and prevent leakage at these intersections. With this arrangement easy access may be had to the working parts for the purpose of cleaning or repairing them. The casing 20 is supported upon standards 24 positioned along its length and a tray 25 is provided to catch any water or material that may be discharged during the operation or cleaning of the apparatus.

The main drive shaft 26 of the apparatus is supported in suitable bearings outside of the casing and may be driven by any suitable means, such as through a motor and any gearing that may be necessary (not shown). A plurality of propellers 27, each having four blades 28 extending radially from a collar 29, are keyed or otherwise fixed to the shaft 26. For example, each of the propellers may contact the one next to it or with a spacer between it and the next propeller and a bolt or other means may be provided at the end of the shaft 26 to clamp all of the propellers and spacers against each other and a shoulder at the other end of the shaft. These several propellers 27 are preferably so positioned on the shaft that their blades 28 project at different angles, as illustrated in Figure 8; for example, each succeeding propeller may be rotated a twelfth of a turn about the shaft. In this manner a discontinuous helical conveyor is provided. Of course, other arrangements of the propellers may be used.

Rows of teeth 30, are fixed to the casing at the top and bottom and extend into the space between the blades 28. The blades 28 are preferably tapered toward their outer ends and the teeth 30 are cut on a slant on one side and shaped to substantially fill the spaces between the paths of the blades.

The blades 28 are each provided with an inclined advancing face 31 positioned at a suitable angle to advance successive portions of material as the shaft rotates and with a vertically disposed surface 32, shaped to give a cutting action as this surface passes close to the rearward edge 33 of the teeth 30. The rows of teeth 30 are shown as extending from the top and bottom of the casing, which arrangement is preferred, but additional rows may project from the casing horizontally or at other angles, if desired.

At the inlet end of the casing there is provided a hopper 34 which may communicate directly, by a closed passage, with a chill bath or other source of the oil-milk emulsion crystals to be used in preparing the margarine (not shown). The bottom portion of this hopper is curled, as illustrated at 35, and a shaft 36, carrying a number of propellers 37 similar to the propellers 27, is positioned therein. This shaft 36 may be driven by any suitable means, for example, by hand, or by a motor or through a train of gears from the main drive shaft 26. The blades 37 are so positioned and shaped as to pass between and close to the blades 28 and, as the shaft 36 rotates in a clockwise direction, to feed the crystals into the casing 20 and to prevent bridging over of the material in the hopper. The friction of the material between the blades 28 and the blades 37 will help to rotate the latter, but it is preferred to provide positive means for rotating the shaft 36.

In the second section of the apparatus there are positioned a number of spider plates 38 which are retained loosely in grooves 39 in the casing 20. These plates are spaced from the shaft 26, as illustrated at 39a, and are keyed against rotation by the key bars 38a (Figure 7) retained at the top and/or bottom of the casing and the key slots 38b in the top and/or bottom of the plates 38. Other means may, of course, be provided for retaining these plates in such a manner that they may be easily removed for cleaning.

These plates 38 are each provided with six spokes 40 extending tangentially from the hub 38c and connecting it with the rim 38d of the plate and leaving large openings 38e in the plate. The forward edges of the spokes 40 are preferably shaped to present cutting surfaces to the material advancing against them. The alternate plates may be reversed as illustrated in Figure 2, so that the spokes 40a extend at the opposite angles from spokes 40, thus leaving irregular passages through this section of the apparatus. Propellers 41, each having four blades 42 fixed to a hub 43 (see Figures 1 and 7), are fixed to rotate with the shaft 26 and are preferably staggered around the shaft, each succeeding propeller being illustrated as about an eighth of a turn from the preceding one. The numbers and shape of the spokes and propellers and the number and positions of the plates may be altered to give the desired rubbing action whereby a portion of the crystals may be smoothed out and the moisture will be retained in the remaining crystals which pass through the spaces between the spokes.

The third section of this apparatus is provided with another set of propellers 27 and with rows of teeth 30 similar to those described for the first section. In this section of the casing, there is provided a horizontal outlet 44 in a lower quadrant of the casing through which the material is discharged. In order to facilitate the discharge of the mass through this outlet, a row of teeth 30a, similar to the teeth 30, is positioned over the outlet. As the shaft 26 rotates, the resistance of the teeth 30a to the rotary movement of the mass causes it to be discharged in a solid mass through the outlet 44. It is preferred also to provide a conical baffle 45 at the end of the casing and a propeller 46 positioned beyond the last propeller 27 and shaped to assist in discharging the material through the outlet 44.

The number of rows of teeth in this section of the apparatus may be such as required to give the desired comminuting and kneading of the material and, if preferred, the teeth in this section, other than those positioned over the outlet 44, may be gradually cut off, as illustrated at 47 in Figure 11, thus decreasing the resistance in this section.

The outlet 44 is preferably provided with means for separating the free water from the plastic mass before it is subjected to subsequent treatment. To accomplish this the bottom surface of the outlet may be made up of a series of plates 44a spaced from each other at their forward ends to provide surfaces inclined upwardly away from the device and with spaces 44b between the adjacent edges of the plates to permit the water to run off. These plates may be supported upon brackets 44c cut and bent inwardly at 44d to provide upwardly inclined stepped supports for the ends of the plates 44a. If desired, the plates may overlap at their adjacent edges or they may be separated slightly to increase the size of the slot between the plates. Any number and dimensions of plates may be used to give the desired separation of water as the plastic mass passes over this surface.

In the operation of my improved apparatus, the oil-milk emulsion crystals from a chill bath or from chill rolls are introduced into the hopper 34. The shaft 26 rotates in a counter-clockwise direction (as viewed from the right in Figure 1) and the advancing surfaces 31 of the propellers advance the crystals against the resistance of the teeth 30, the cutting edges 32 and 33 providing a communicating and slicing action. When the mass reaches the second section of the apparatus, the propellers 42 force the material against the spokes 40 and 40a and through the openings therebetween, thus further kneading and working the mass to smooth out a portion of the crystals and separate the liquid from them, the remainder of the crystals retaining sufficient moisture to give the desired moisture content to the finished mass. It is then advanced into the third section, where it is subjected to an action similar to that in the first section and discharged through the outlet 44.

The mass discharged from this apparatus is thoroughly comminuted and kneaded and contains a considerable amount of free water entrained between the crystals and which may be readily removed in an expeller as described in my said copending application Serial Number 756,237, entitled "Expeller". If desired, water outlet holes may be placed in the bottom of the casing 20 on the following or low pressure side of the lower row of teeth 30. I prefer, however, to retain the water in the mass until after it passes through the last section of the casing, so that the free water may be thoroughly distributed throughout the mass in a finely divided condition. In this manner a more uniform product may be obtained which bears a closer resemblance to natural butter. As the mass leaves the casing 20, it may be passed over the stepped plates 44a whereby any free water will run off through the slots 44b.

It is preferred to use the spider plates illustrated in Figure 2, in the middle section of the apparatus, although in some instances it may be desirable to use plates as illustrated in Figures 4, 5 and 6. These plates 48 are provided with numerous elliptical holes 49 extending lengthwise through the plate at an angle, as illustrated in Figure 6, to provide a sharp edge 50 against which the mass is forced by the rotation of the blades 42.

After passing through the apparatus described and an expeller such as that illustrated in my said copending application Serial Number 756,237, entitled "Expeller", or some other means for separating the excess water liberated during the preceding step, salt and milk may be added, for example, by a device as illustrated in my said application Serial Number 621,651. After passing through the salter, the material may be introduced into the apparatus illustrated in Figure 11, which is similar to the apparatus previously described. In this apparatus the casing 20b, which is of a construction similar to casing 20, is provided with a horizontal inlet 51 in a lower quadrant of the casing, through which the material is introduced from the salter. In the first section of this device a helical conveyor 52 is fixed to the drive shaft 26a. This conveyor is provided with a cutting edge 53 which is shaped to contact with the cylindrical surface of the casing and is notched as illustrated at 54 to provide additional sharpened cutting edges adapted to cut into the mass of plastic material being supplied to it. A plate 55 may be positioned in the casing just back of the inlet 51. This plate is provided with a number of apertures 56 in its lower segment to allow the discharge of water liberated at this point. The edges of the apertures 56, on the side opposite from the direction from which the conveyor 52 travels, are cut out or tapered off as illustrated at 57 to prevent discharging of the mass through the apertures.

A second plate 58, having an opening 59, is positioned in the casing 20b and a water drain 60 is positioned between the plates 55 and 58. A slinger plate 61 is fixed to the shaft 26a between the plates 55 and 58. As the shaft rotates the slinger plate will throw the water outwardly toward the drain 60. Access may be had to the space between the plates 55 and 58 through the opening 59 for the purpose of cleaning this portion of the apparatus.

The apparatus described in Figure 11 is also provided with a number of sections having propellers 27 and teeth 30 like those illustrated in Figures 8, 9 and 10 and the discharge 44a may be arranged in a manner similar to the discharge 44, a row of teeth 30a being positioned over the outlet. Also, suitable means, as illustrated at 45 and 46 and described above, may be provided for expediting the discharge of the mass.

If desired, a row of teeth 30b may be positioned horizontally in the last section of the apparatus, although I prefer to use only the rows of teeth at the top and bottom of the casing. These teeth 30b and the teeth 30 in this section may be cut off as indicated at 47, if desired, thus reducing the cutting action and the resistance to rotation of the mass except that provided by the teeth 30a just above the outlet.

Any excess water separated in this apparatus should be withdrawn. This may be done by providing holes 62 through the casing at points just beyond the rows of teeth 30 at the bottom of the casing, that is, where the material is under reduced pressure.

A propeller 63 with enlarged blades may also be fixed to the shaft 26a to assist in progressing the material through the apparatus.

The material from the salter is passed through the kneader or blender shown in Figure 11 wherein the material is thoroughly blended and further kneaded and the finished product is discharged through the discharge 44a, from which it may be conveyed to the "print" machine and packaged.

Other means than the helical screw 52 may be used to cut off and convey the plastic material through the casing 20b, although it is preferred to use such a helical cutter which will cut off and advance the plastic material as it is advanced into the casing 20b. If preferred, other means for introducing the crystals into the casing 20 may be used; for example, a helical screw such as illustrated in Figure 11 might be used at the inlet end of this device, although I prefer to use a device as illustrated in Figures 1 and 8.

Various modifications may be made in the apparatus described above which is described as illustrative of my invention and it is not intended to limit the invention to the particular embodiments shown. Also, other combinations of the details described herein may be used together or with other apparatus to give the desired degree of working and kneading. The terms used in describing and claiming the invention have been used in their descriptive sense and not as terms of limitation and it is intended that all equivalents thereof be included within the scope of the appended claims.

What I claim is:

1. In an apparatus of the class described, a casing, a shaft rotatable therein, and a plurality of blades fixed to said shaft and tapered toward their outer ends, a plurality of teeth fixed to said casing and extending between said blades, said teeth being shaped to substantially fill the space between the paths of the blades, and said blades being shaped to advance the contents of said casing along said shaft.

2. In an apparatus of the class described, a casing having a row of fixed teeth extending inwardly therefrom, and a shaft having blades adapted to rotate between the said teeth and shaped to advance the contents of the casing along the shaft, said casing having an outlet in the side thereof, said outlet being positioned in advance of the row of teeth in relation to the direction of rotation of the shaft.

3. An apparatus as defined in claim 2, including a second row of fixed teeth extending from the inner surface of the casing, a portion of the teeth of said second row being of decreased length opposite said opening.

4. An apparatus as defined in claim 2, including a second row of fixed teeth extending from the inner surface of the casing, said second row having teeth of progressively decreasing length opposite the said opening.

5. An apparatus as defined in claim 2, including a plurality of rows of fixed teeth spaced around the inner surface of the casing, each of said rows having a portion of the teeth therein of decreasing length opposite said opening.

6. In an apparatus of the class described, a casing having a row of fixed teeth extending inwardly from the inner surface of said casing, and a shaft carrying a plurality of blades adapted upon rotation of the shaft to pass between said teeth, said casing having outlet holes extending through the bottom thereof beyond the said row of teeth in relation to the direction of rotation of said shaft.

7. In an apparatus of the class described, a casing having a row of fixed teeth extending inwardly from the inner surface thereof, a shaft carrying a plurality of blades adapted upon rotation of the shaft to pass between said teeth and advance the material through the casing, said casing having a side inlet therein, and means for advancing the material from said inlet to said teeth comprising a screw conveyor having a knife edge projecting forwardly to cut off the material as it is fed in through the inlet.

8. An apparatus of the type described, comprising a casing having a cylindrical inner surface, a shaft adapted to rotate in said casing and having fixed thereon a plurality of propellers having surfaces adapted to advance the material in the casing and a plurality of teeth fixed to said casing and adapted to resist rotation of said material with the propellers, a second group of propellers, plates having openings therein positioned between the propellers of the second group, and a third group of propellers beyond said plates, said casing having an outlet in the side thereof opposite said third group of propellers.

9. An apparatus as defined in claim 8 in which the plates are made up of spokes extending tangentially from the hub to the rim of the plate.

10. An apparatus as defined in claim 8 in which the plates are provided with a plurality of holes extending through said plates at such angles as to present tapered surfaces to the material advanced by the propellers.

11. An apparatus as defined in claim 8 in which the plates are provided with a plurality of elongated holes extending through said plate at an angle of less than 90° to the surface of the plate and presenting a sharpened end to the material advanced by the propellers.

12. In an apparatus of the type described, a casing, a plurality of spaced stationary spider plates in said casing, and propellers substantially filling the spaces between said plates, said spider plates comprising a hub, a rim, and spokes extending from the hub to the rim of the plate.

13. An apparatus as defined in claim 12 in which the spokes extend tangentially from the hub to the rim.

14. An apparatus as defined in claim 12 in which the spokes extend from the hub to the rim at angles other than radially and in which the alternate plates are reversed.

15. In an apparatus of the type described, a casing having an inlet opening in the side thereof, a shaft extending through said casing, and a helical screw on said shaft, said helical screw having its edge turned over to provide a cutting edge and said cutting edge having notches cut therein.

16. In an apparatus of the type described, a casing, a propeller within said casing for advancing plastic material therein, and a plate in said casing behind said propeller having openings for the escape of liquid, said openings having the edges away from the direction of rotation of the propeller tapered off so as to prevent extrusion of the plastic material through said openings.

17. In an apparatus of the type described, a casing, a shaft in said casing, a propeller on said shaft, a fixed plate extending across said casing behind said propeller, said plate being provided with openings in its lower quadrant for the escape of liquid, a second fixed plate extending across said casing and spaced from said first mentioned plate, an opening in the casing between said plates, and a plate fixed to said shaft between the said fixed plates.

18. The combination with a device for working margarine, of a surface outside of the worker over which the worked material passes, said surface comprising a plurality of plates slanting downwardly toward said working device, said plates being positioned so that the outer edge of each plate is higher than the inner edge of the next plate to leave spaces for the escape of liquid between the adjacent edges of the plates.

19. In apparatus of the class described, a casing having a main shaft with a plurality of blades thereon adapted to rotate therewith and to advance the contents of the casing along the shaft, a hopper adapted to discharge into said casing, said hopper having a throat positioned at one side of said main shaft, and a second shaft positioned in said throat and carrying blades adapted to rotate between the blades on the first mentioned shaft to agitate the material in the hopper and to advance said material into the casing.

JACOB SCHAUB.